May 23, 1933. T. H. HARRIS 1,909,950
MEANS FOR DRYING, CLEANING, AND CONDITIONING COTTON
Filed Jan. 5, 1931 3 Sheets-Sheet 1
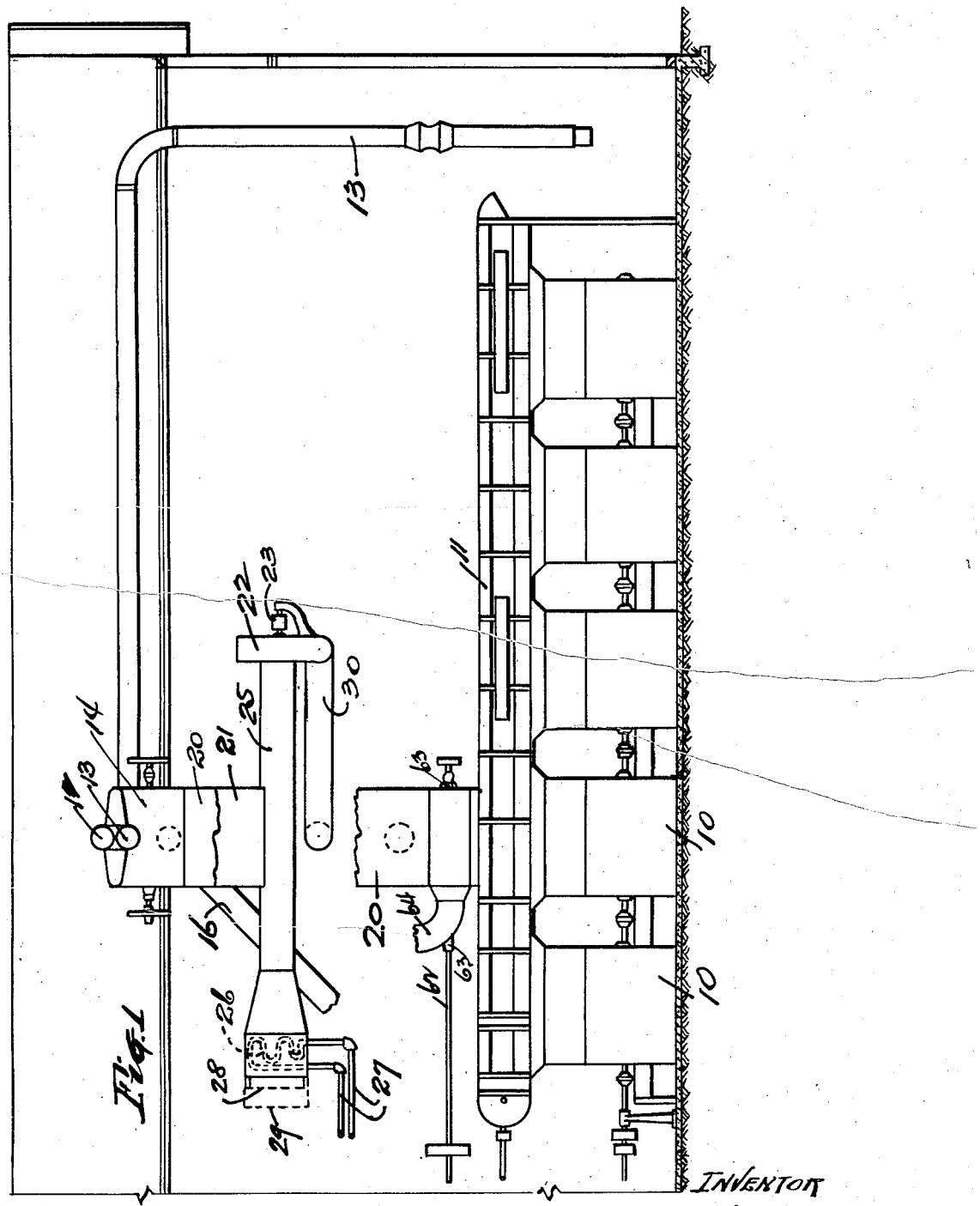

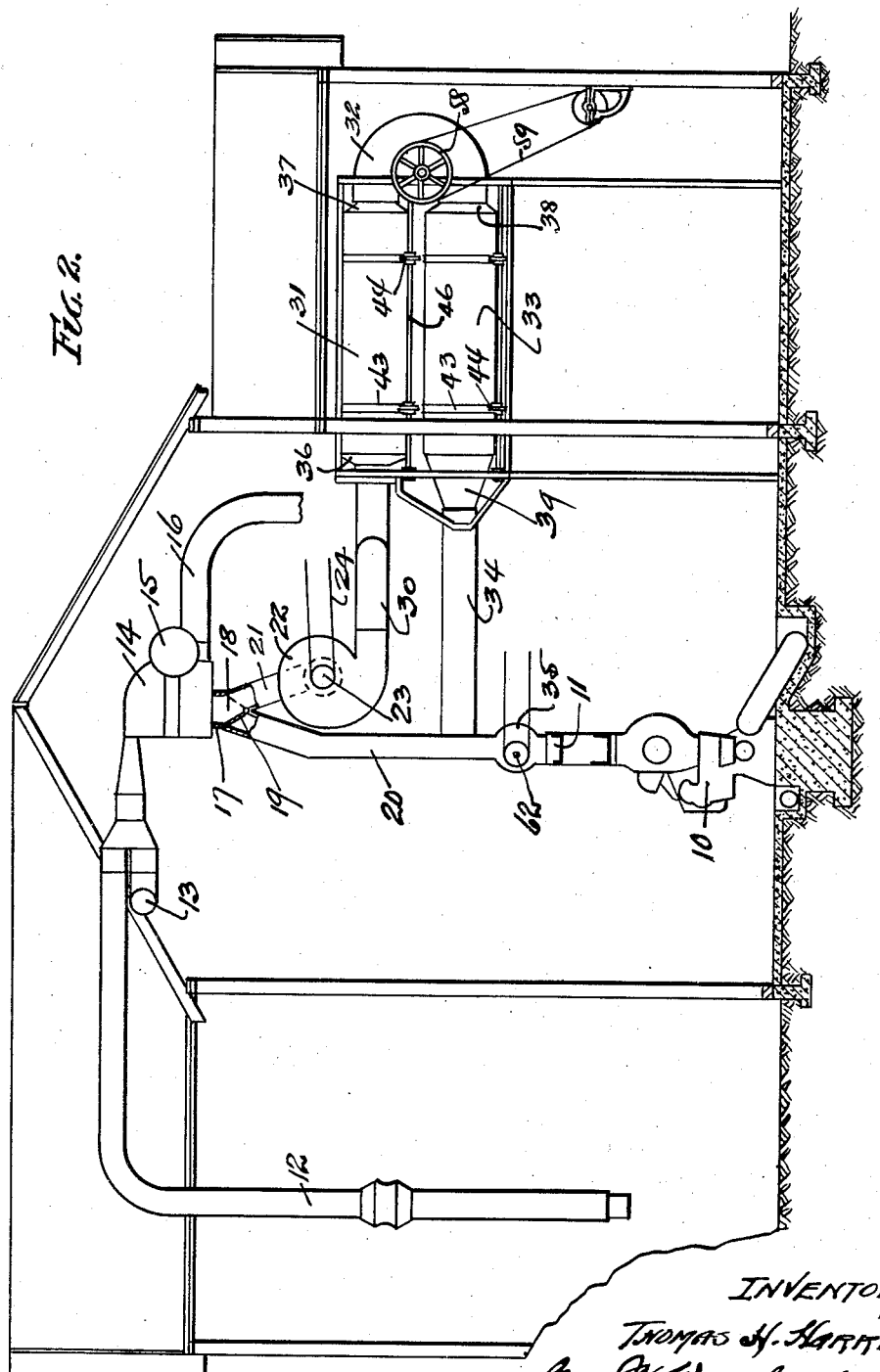

May 23, 1933.  T. H. HARRIS  1,909,950
MEANS FOR DRYING, CLEANING, AND CONDITIONING COTTON
Filed Jan. 5, 1931  3 Sheets-Sheet 3
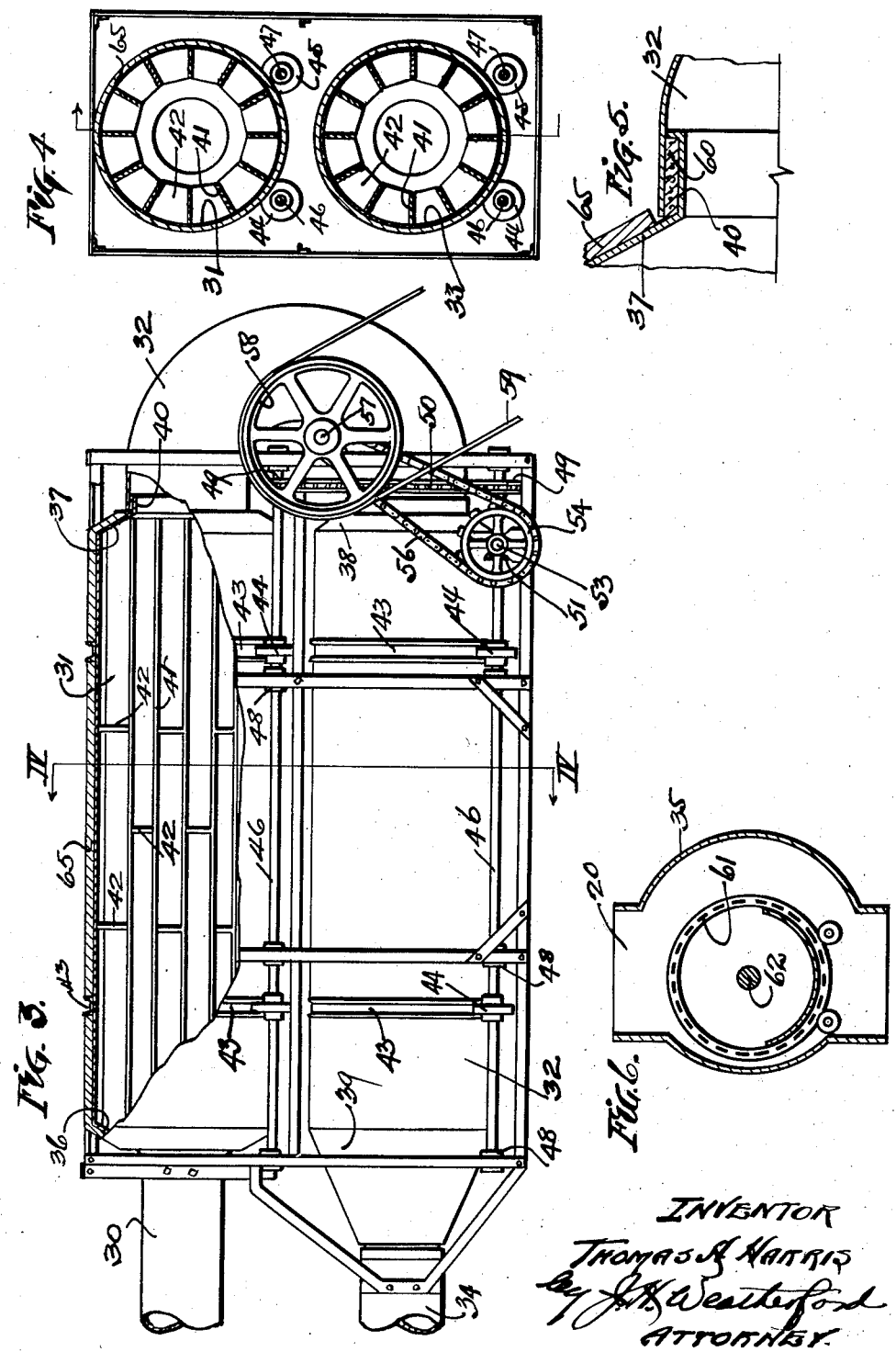

Patented May 23, 1933

1,909,950

UNITED STATES PATENT OFFICE

THOMAS H. HARRIS, OF SCOTT, MISSISSIPPI, ASSIGNOR OF ONE-HALF TO DELTA & PINE LAND COMPANY OF MISSISSIPPI, OF SCOTT, MISSISSIPPI, A CORPORATION OF MISSISSIPPI

MEANS FOR DRYING, CLEANING, AND CONDITIONING COTTON

Application filed January 5, 1931. Serial No. 506,527.

This invenion relates to means and methods for drying, cleaning and conditioning cotton or other farm products such as hay.

In gathering cotton and harvesting hay it often happens that rainy weather so wets the cotton as to prevent subsequent ginning thereof or so wets the hay as to cause molding and subsequent loss thereof. Also cotton and/or hay frequently contain an excess amount of moisture, which must be removed before such products are in condition for storing or marketing.

In order to avoid the delays and/or losses which are incident to such conditions numerous attempts have been and are being made to provide driers which will remove the moisture and much has been accomplished along this line. The majority of these driers if not all of them however, are open to the serious objection that it is almost impossible to prevent over-drying of only slightly damp products or underdrying of very green and wet products, in the first case seriously damaging the staple of the cotton or the quality of the hay, and in the latter case failing to condition the cotton for ginning or failing to prevent subsequent molding and heating of the hay.

The objects of the present invention are to provide means and methods for moving such a product by means of a current of heated air; loosening the product mechanically during its passage; mechanically retarding the passage of the product and automatically presenting it again and again to the current of air, and delivering only such parts of the product as have been properly dried, for ginning or storage as the case may be.

I accomplish these objects by delivering the product into a moving column of heated air, carrying the product with this column or air through the fan by which the air current is set up, thus subjecting the product to the mechanical beating action of the fan in the presence of the heated air, discharging the product so treated through a retarding device which permits the damp and heavier portions of the product to be withdrawn by the action of gravity from the lighter and drier products, thereafter returning the damper portions of the product again and again into the air current for further treatment and drying and as they dry out for advancement by the air current and eventual delivery either to machinery for further treatment or directly to storage as may be desired. The manner in which these and the other objects are accomplished and the method of their accomplishment, particularly so far as they relate to cotton, will readily be understood from the following specification on reference to the accompanying drawings, in which:—

Fig. 1 is a side elevation of a five saw gin stand showing the device applied thereto;

Fig. 2 is an end elevation of the same installation showing a side elevation of the preferred form of my improved drying device;

Fig. 3 is an enlarged side elevation partially in section showing the drying drums;

Fig. 4 is a section through the drums on the line IV—IV of Fig. 3;

Fig. 5 is an enlarged fragmentary detail suggesting the manner of packing the joint between the revolving drum and the fixed pipes; and Fig. 6 is an enlarged fragmentary sectional elevation of one of the separators.

Referring now to the drawings in which the various parts are indicated by numerals, 10 are gin stands of any usual or desired type and 11, a conveyor or distributor for carrying and distributing cotton to these gins. 12 is a suction pipe for unloading cotton from the wagons in which it is usually hauled from the fields and 13 a similar suction pipe for picking up what is known as overflow cotton from the gins and restoring the same to the ginning circuit. 14 is a separator into which these suction pipes discharge, 15 a suction fan and 16 an air discharge pipe from this separator. All of these devices and parts being wellknown in the art of ginning cotton, and not being an inheret part of the present invention need not be described in detail.

From the separator 14 a pipe 17 leads directly downward and discharges into a flue 18 which is provided with a butterfly valve 19 by which the cotton may be diverted into a connecting flue 20 leading directly to the gins or into a flue 21 leading to the present drier. As shown in Fig. 2, the butterfly valve is set to direct the cotton to the drier which forms the subject matter of the present invention.

22 is a fan which is driven through a pulley 23 and belt 24 from a source of power not shown. 25 is a suction pipe, preferably horizontally disposed leading to the fan into which pipe the flue 21 discharges. Mounted on the outer end of this pipe is an air heater 26 of any usual and wellknown construction, preferably being a rectangular box in which are steam coils to which steam is supplied from an exterior source by means of pipes 27. If desired screens 28 and 29 may be employed at the mouth of this heater. It will be understood that the heater is purchased in the open market and the detail thereof is no part of the present invention.

The fan 22 discharges through a horizontal pipe 30 directly into a horizontal revolving drum 31 which may be of any necessary or desired length. In the present instance it is shown comparatively short and discharging through a return bend 32 into a second drum 33 of similar construction. It will be understood, however, that a single long drum might be used instead of the two drums should it be so desired, or a number of drums may be used. From the drum 33 a pipe 34 leads into the flue 20. 35 is a separator for allowing escape of the air and separating the cotton therefrom to permit its discharge to the distributor 11, and particularly to check the otherwise violent descent of the cotton on to the distributor, and catch dislodged dust, and/or other foreign matter.

Referring now more especially to Figs. 3 and 4 the drums 31 and 32 each comprise a cylindrical barrel having truncated cone shaped ends 36, 37 and 38, 39 respectively, each of these ends being provided with a short cylindrical section 40. The pipe 30 telescopes into this cylindrical portion of the end 36, the end 37 similarly telescopes into the return bend 32 this bend in turn into the bend 38 and the end 39 in turn into the pipe 34.

The interior of the drums 31 and 32 is divided by substantially radial ribs 41 each extending inward from the shell, into a plurality of long compartments each open toward the center of the drum. These compartments are divided by transverse partitions 42 into shorter compartments, the divisions in adjacent compartments preferably being out of register. The drums are rotatably mounted, each preferably being provided with a pair of circumferential curved and grooved tracks 43 and supported by two pairs of rollers 44, 45 which run in these grooved trackways so that each trackway rests on a pair 44, 45 of rollers. The two rollers 44 for each drum are mounted on and secured to similar shafts 46 and the pairs of rollers 45 on shafts 47 all of the shafts being supported and journalled in substantially identical bearings 48. Each shaft carries and has secured thereto a sprocket wheel 49 all four sprocket wheels being connected and driven by a sprocket chain 50. Mounted on one of the shafts 46 is a miter gear 51 meshing with a similar gear which is mounted on and secured to a shaft 53, this shaft also carries and has secured thereto a sprocket wheel 54 which is driven from a sprocket pinion through a chain 56. 57 is the shaft for the pinion 58 a belt pulley thereon and 59 a drive belt leading to a source of power not shown.

It will be seen that the drums turn relatively to the pipes 30, 32 and 34 and in order to prevent escape of air at such junctions these joints are provided with suitable packing 60 preferably of asbestos.

The separator 35 preferably comprises an arcuate enlargement in the flue 20 in which is eccentrically mounted a cylindrical screen 61 which is mounted on a shaft 62 journalled in suitable bearings 63 and driven from a source of power not shown. Extending from the separator in alignment with the axis of the screen 61 is an air flue 64 through which the air discharged by the pipe 34, and which passes through the screen 61, may escape, this air in its escape carrying a considerable amount of dirt and finer particles where such exist in the materials.

Preferably the heater 26 the pipe 25 therefrom the fan 22 the pipes 30, 32, 34 and the drums 31 and 33 are insulated in wellknown manner by covering them with asbestos to prevent loss of heat by radiation, as indicated in the sections of the drums by the numeral 65.

In using the device for conditioning and drying cotton, cotton is brought in, as by wagon, and placed under the pipe 12. It is raised by suction from the wagons to the separator 14 which separator releases it from the air current and allows it to drop into the flue 18 and be diverted by the butterfly valve 19 directly to the gin, in which case the present apparatus does not apply, or is directed through the flue 21 to the pipe 25.

Air is drawn by suction of the fan 22 through the heater 26 and picks up the cotton discharged from the flue 21 into the pipe 25. This cotton is drawn into the fan and is whirled and beaten thereby in the presence of heated air, and is discharged through the pipe 30 into the revolving drum 31 which is of larger size than the pipe.

Comparatively dry cotton being light is largely blown directly through the drum into the return bend 32. Damp cotton being heavier falls into the compartments then at the bottom of the drum and is carried up in these compartments and discharged near the top of the drum downward through the air current being advanced in such action solely by the force of the air current, the transverse partitions acting to prevent advancement along the drum shell. Wet cotton is retained in the drum and repeatedly subjected to the action of the air current until such time as the locks are loosened up and dried out sufficiently to permit the air current finally to carry them on into the return bend and thence into the second drum where they are again similarly treated. From this second drum the loosened and dried locks of cotton are blown into the flue 20, and downward therein against the revolving screen 61 which screen permits the finer particles of dust and other foreign substances to penetrate radially inward and thereafter to be carried away by the escaping air. The revolving drum carries the cotton over and allows it to drop downward to the distributor 11 by which it is fed in usual manner to the gin. Cotton to be thus treated is usually received in a wadded and dirty condition, is beaten up and fluffed by the action of the fan and the air currents therein, is dried by the heated air and is further fluffed and straightened by the action of the air currents which carry it along. These same actions serve to dry out and loosen the dirt and other impurities brought in with the cotton and eventually remove a portion thereof.

It has been found after ginning that the cleaning, conditioning and drying incident to this method of handling cotton have improved the grade of material as compared with similar cotton not so treated.

While this device is primarily designed for handling cotton it may be used in the handling of hay and similar products provided they be cut up prior to treatment in order that they may pass through the apparatus here described.

It is found that dry cotton which would be injured by excessive heating, passes through the device with much greater rapidity than wet or matted cotton requiring more extended treatment and that by regulating the amount of heat supplied to the heater and the speed of feeding that a wide range of conditions may be satisfactorily taken care of.

It will be understood that no particular type of heater is necessary so long as dry heated air is furnished and it will also be understood that the separator suggested for final delivery of treated cotton is typical only.

Having described my invention, what I claim is:

1. The method of drying and conditioning cotton or the like, comprising subjecting it to a preliminary beating action in the presence of a pre-heated current of air, impelling the beaten mass by such current of heated air, allowing it to drop below such air current and mechanically checking its progress, carrying it above said air current while shielding it therefrom, allowing it to drop through and be subject to the transversing action of said air current, whereby the heavier portions of said portions of said materials may drop through said air current and be again carried above and be subjected to the action of said current and the lighter dried and conditioned portions be advanced and delivered by such current.

2. The method of drying and conditioning cotton or the like, comprising subjecting it to a preliminary beating action in the presence of a preheated current of air, traversing the beaten mass by such current of heated air, allowing it to drop below such air current and mechanically checking its progress, and thereafter repeatedly, carrying it above said air current while shielded therefrom and allowing it to drop through and be subject to the transversing action of said air current, whereby the lighter portions of such materials may be rapidly advanced and the heavier portions of said materials may drop through said air current and be subjected again and again to the action of such current until dried, and thereafter with the lighter dried and conditioned portions be advanced and delivered by such current.

3. The method of drying and conditioning cotton or the like comprising traversing it by a current of pre-heated air, allowing the heavier portions of the material to drop below such air current and mechanically interrupting their progress, carrying them above said air current while shielding them therefrom and allowing them to drop through, and be subject to the transversing action of said air current, whereby the lighter dried portions of such materials may be rapidly advanced and delivered and the heavier portions of said materials may drop through said air current and be again carried above and be subjected to the action of said currents until dried and with the lighter dry and conditioned portions be advanced and delivered by such current.

4. The method of drying and conditioning cotton or the like comprising initially subjecting it in mass to the heating action of a current of pre-heated air and moving it along thereby, whereby initial heating is accomplished, and further traversing it by such current of heated air, allowing the heavier portions of the material to drop below such air current and mechanically interrupting their progress, repeatedly carrying such heavier portions above said air current while shielding them therefrom and allowing them to drop through and be subject to the drying and traversing action of said air current, whereby the lighter portions of such materials are separated from the heavier portions and rapidly advanced, and the heavier portions of said materials are retarded and caused to drop through said air current and are again carried above and subjected to the action of said air currents until dried, and with the lighter dry and conditioned portions are advanced and delivered by such current.

5. The method of drying and conditioning cotton or the like for ginning comprising traversing it by a current of pre-heated air, allowing the heavier portions of the material to drop below such air current and mechanically interrupting their progress, carrying them above said air current while shielding them therefrom and allowing them to drop through, and be subject to the traversing action of said air current, whereby the lighter dried portions of such materials may be rapidly advanced and delivered and the heavier portions of said materials may drop through said air current and be again carried above and be subjected to the action of said currents until dried and with the lighter dry and conditioned portions be advanced and delivered by such current, and thereafter subjecting such delivered materials to a screening action for the removal of dried particles of trash therefrom.

6. The method of drying and conditioning cotton or the like for ginning comprising initially subjecting it in mass to the heating action of a current of pre-heated air and moving it along thereby, whereby initial heating is accomplished, and further traversing it by such current of heated air, allowing the heavier portions of the material to drop below such air current and mechanically interrupting their progress, repeatedly carrying such heavier portions above said air current while shielding them therefrom and allowing them to drop through and be subject to the drying and traversing action of said air current, whereby the lighter portions of such materials are separated from the heavier portions and rapidly advanced, and the heavier portions of said materials are retarded and caused to drop through said air current and are again carried above and subjected to the action of said air currents until dried, and with the lighter dry and conditioned portions are advanced and deilvered by such current, and thereafter subjecting such delivered materials to a screening action for the removal of dried particles of trash therefrom.

7. The method of drying and conditioning cotton or the like, which consists in subjecting a mass of cotton to a preliminary heating, by a current of hot air of a force sufficient to traverse said mass, and thereafter by said current separating and conveying dried cotton to a remote point, allowing the undried cotton to drop below the current of air and retarding the progressive movement thereof while causing uninterrupted progress of the dried cotton, elevating the undried cotton above the current of air while shielding it from the progressing action thereof, and permitting the cotton to again traverse said current of air whereby the lighter dried portion of the cotton may be torn away from the heavier wet portion repeatedly until the entire mass is dried and conveyed to said distant point, and whereby dried cotton will be subjected to a minimum heating and drying period, and undried cotton retained until dried.

In testimony whereof I hereunto affix my signature.

THOMAS H. HARRIS.